United States Patent
Irle et al.

(10) Patent No.: US 6,420,478 B1
(45) Date of Patent: Jul. 16, 2002

(54) BINDER COMPOSITIONS AND THEIR USE IN AQUEOUS COATING AND ADHESIVE COMPOSITIONS

(75) Inventors: Christoph Irle, Krefeld; Hans-Josef Laas, Köln; Wolfgang Kremer, Kerken; Rolf Roschu, Willich; Erhard Lühmann, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/602,281

(22) Filed: Jun. 23, 2000

(30) Foreign Application Priority Data

Jun. 29, 1999 (DE) .......................................... 199 29 784

(51) Int. Cl.⁷ ................................................ C08K 3/20
(52) U.S. Cl. ....................................... 524/591; 524/555
(58) Field of Search ................................... 524/591, 555

(56) References Cited

U.S. PATENT DOCUMENTS

| 5,075,370 A | 12/1991 | Kubitza et al. ............. 524/591 |
| 5,252,696 A | 10/1993 | Laas et al. ..................... 528/49 |
| 6,204,323 B1 | 3/2001 | Wamprecht et al. ......... 524/591 |

FOREIGN PATENT DOCUMENTS

| CA | 2272355 | 11/1999 |
| CA | 2272391 | 11/1999 |
| EP | 469389 | 2/1992 |

OTHER PUBLICATIONS

D. Dieterich, Prog. Org. Coatings 9, (month unavailable) 1981, pp. 281–340, Aqueous Emulsions, Dispersions and Solutions of Polyurethanes; Synthesis and Properties.

Vaihinger, I–Lack 64 (12), (month unavailable) 1996, pp. 710–715, 2K–Hydrolacke für Holz und Kunststoffoberflächen.

Primary Examiner—Kriellion A. Sanders
(74) Attorney, Agent, or Firm—Joseph C. Gil; Thomas W. Roy

(57) ABSTRACT

The present invention relates to a binder composition containing
  A) 70 to 99% of a polyurethane dispersion having an OH number of <10 mg KOH/g of solid resin and
  B) 1 to 30% of a water-dispersible polyisocyanate mixture prepared from an aliphatic, cycloaliphatic, araliphatic and/or aromatic diisocyanate, wherein the polyisocyanate mixture has
    a) an average isocyanate functionality of at least 2.0,
    b) a content of isocyanate groups (calculated as NCO; molecular weight 42) of 5.0 to 25.0 wt. %, and
    c) a content of ethylene oxide units of 2 to 50 wt. % (calculated as $C_2H_4O$; molecular weight 44) present within polyether chains containing an average of 5 to 35 ethylene oxide units, wherein at least 60 mole % of the polyether chains are connected via allophanate groups to two polyisocyanate molecules which are each prepared from at least two diisocyanate molecules and wherein the solids contents of components A) and B) add up to 100%.

15 Claims, No Drawings

BINDER COMPOSITIONS AND THEIR USE IN AQUEOUS COATING AND ADHESIVE COMPOSITIONS

BACKGROUND OF THE INVENTION

1. Field of the Invention

The present invention relates to binder compositions for aqueous coating compositions, a process for their production, and their use for coating substrates with high mechanical stresses.

2. Description of the Prior Art

Aqueous systems are increasingly being used for coating high mechanically stressed surfaces such as wood, plastics or concrete floors. Demands placed on such coating systems include, in particular, high resistance to chemicals and water, and also to mechanical damage. These demands are largely met by polyurethane dispersions. The possible ways of producing such dispersions have been summarized for example by D. Dieterich in a review article [D. Dieterich, Prog. Org. Coatings 9, 281 (1981)].

As is known from EP-A-0 358 979, the chemical and mechanical resistance of coatings can be improved if crosslinking agents with free isocyanate groups are added to aqueous dispersions containing hydroxyl groups.

The incorporation of such isocyanate-functional crosslinking agents in aqueous dispersions is improved if the polyisocyanates have hydrophilic groups. Hydrophilic polyisocyanates are described, for example, in EP-B 0 540 985. These polyisocyanates also improve the chemical and physical resistance of dispersions free of hydroxyl groups (see, for example, Vaihinger, I-Lack 64 (12), p. 710 [1996]).

The known compositions containing hydrophilic polyisocyanates and polyurethane dispersions have the recurring disadvantage that it is difficult to mix the components.

Thus, in order to produce a shiny, transparent film it is necessary to use a dispersion unit having a high shear action or to pre-dilute the crosslinking agent with water (see for example Carver S.r.l., Technical Leaflet DIVA/S, DIVA/O, rev.04 of 16.02.1998). However, dispersion units are not available for manual coating, which is normally the case when sealing parquet floors. If curing components have to be pre-diluted in an accurately defined amount and time, the application of the two-component coating composition is made considerably more difficult.

It is known from DE-A-19 847 077 and DE-A-19 822 890 that polyisocyanates containing allophanate groups can be incorporated more easily into binders containing hydroxyl groups. However, these binders are not suitable as one-component binders without a curing component.

An object of the present invention is to provide compositions containing polyurethane dispersions and polyisocyanate crosslinking agents that result in coatings having excellent resistance to mechanical and chemical stress and that can also easily be formulated (blended) manually to produce a clear, shiny coating having excellent resistance properties. A further object of the present invention is to provide a coating system that also produces a durable coating without the use of a curing component. The advantage of a simpler application without having to incorporate the curing component can be achieved if correspondingly less stringent requirements have to be satisfied, for example, when coating less highly stressed floors, in which case the maximum achievable resistance does not have to be met.

It has now surprisingly been found that the object can be achieved with the binder compositions of the present invention, which are described in more detail hereinafter.

SUMMARY OF THE INVENTION

The present invention relates to a binder composition containing
- A) 70 to 99% of a polyurethane dispersion having an OH number of <10 mg KOH/g of solid resin and
- B) 1 to 30% of a water-dispersible polyisocyanate mixture prepared from an aliphatic, cycloaliphatic, araliphatic and/or aromatic diisocyanate, wherein the polyisocyanate mixture has
    - a) an average isocyanate functionality of at least 2.0,
    - b) a content of isocyanate groups (calculated as NCO; molecular weight 42) of 5.0 to 25.0 wt. %, and
    - c) a content of ethylene oxide units of 2 to 50 wt. % (calculated as $C_2H_4O$; molecular weight 44) present within polyether chains containing an average of 5 to 35 ethylene oxide units, wherein at least 60 mole % of the polyether chains are connected via allophanate groups to two polyisocyanate molecules which are each prepared from at least two diisocyanate molecules and wherein the solids contents of components A) and B) add up to 100%.

DETAILED DESCRIPTION OF THE INVENTION

Polyurethane dispersions A) according to the invention are prepared from
- A1) 5 to 70% by weight of polyisocyanates,
- A2) 10 to 80% by weight of polymeric polyols having a number average molecular weight of 400 to 6000,
- A3) 0 to 10% by weight of monohydric alcohols or monoamines,
- A4) 0.5 to 15% by weight of polyols, aminopolyols or polyamines having a number average molecular weight of less than 400 and
- A5) 0 to 20% by weight of polyoxyalkylene ethers having with at least one hydroxy or amino group, wherein the solids contents of components A1) to A5) add up to 100% and preferably at least one of components A3) and/or A4) contains an ionic group or a groups capable of forming an ionic group.

The ionic group may be cationic or anionic, preferably anionic. The phrase "capable of forming an ionic group" refers to the incorporation of compounds with, for example, free acid groups, such as carboxyl groups, into the polyurethane, which can subsequently be converted by neutralization into ionic groups.

Suitable diisocyanates A1) include those having a molecular weight of 140 to 400 and containing aliphatically, cycloaliphatically, araliphatically and/or aromatically bound isocyanate groups. Examples include 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophorone diisocyanate or IPDI), 4,4'-diisocyanato-dicyclohexylmethane, 1-isocyanato-1-methyl-4(3) isocyanato-methylcyclohexane, bis-(isocyanatomethyl)-norbornane, 1,3- and 1,4-bis-(2-isocyanatoprop-2-yl)-benzene (TMXDI), 2,4- and 2,6-diisocyanato-toluene (TDI), 2,4'- and 4,4'-diisocyanatodiphenyl-methane, 1,5-diisocyanatonaphthalene and mixtures thereof.

Preferred polyisocyanates or polyisocyanate mixtures are those exclusively containing aliphatically and/or cycloaliphatically bound isocyanate groups. Particularly preferred starting components A1) are polyisocyanates or polyisocyanate mixtures containing HDI, IPDI and/or 4,4'-diisocyanatodicyclohexylmethane.

Also suitable as polyisocyanates A1) are lacquer polyisocyanates prepared from at least two aliphatic, cycloaliphatic, araliphatic and/or aromatic diisocyanate molecules and containing a uretdione, isocyanurate, urethane, allophanate, biuret, iminooxadiazine dione and/or oxadiazine trione groups, which are described, for example, in J. Prakt. Chem. 336 (1994) 185–200, DE-A-1 670 666, DE-A-1 954 093, DE-A-2 414 413, DE-A-2 452 532, DE-A-2 641 380, DE-A-3 700 209, DE-A-3 900 053, DE-A-3 928 503, EP-A-0 336 205, EP-A-0 339 396 and EP-A-0 798 299.

Polymeric polyols A2) include the known polyols from polyurethane chemistry, which have an average OH functionality of 1.8 to 4. Examples include polyacrylates, polyesters, polyethers, polycarbonates, polyester carbonates, polyacetals, polyolefins and polysiloxanes. The polyols preferably have a number average molecular weight of 600 to 2500 and an average OH functionality of 2 to 3.

In addition to the use of difunctional OH components, it is also possible, as is known from the literature, to terminate the polyurethane prepolymers with monofunctional alcohols A3). Suitable monohydric alcohols A3) are preferably aliphatic monohydric alcohols with 1 to 18 carbon atoms, such as ethanol, n-butanol, ethylene glycol monobutyl ether, 2-ethylhexanol, 1-octanol, 1-dodecanol and 1-hexadecanol.

The known polyols, aminopolyols and polyamines A4) having a molecular weight of less than 400 may be used as chain extenders to prepare the polyurethanes or polyurethane dispersions. Examples include ethanediol, 1,4-butanediol, 1,6-Hexanediol, neopentylglycol, cyclohexanedimethanol, trimethylolpropane, glycerol, hydrazine, ethylene diamine, 1,4-diaminobutane, isophorone diamine and 4,4-diaminodicyclohexylmethane.

The polyurethane dispersions according to the invention may also contain hydrophilic polyoxyalkylene ethers A5), which have at least one hydroxy or amino group. These polyethers contain a high proportion (about 30 to 100 wt. %) of ethylene oxide units. Examples include linear polyethers having a functionality of 1 to 3, as well as compounds corresponding to formula I

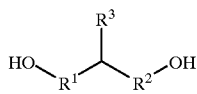

wherein
 $R^1$ and $R^2$ may be the same or different and represent divalent aliphatic, cycloaliphatic or aromatic radicals having 1 to 18 carbon atoms that may contain oxygen and/or nitrogen atoms and
 $R^3$ represents a non-hydroxy-terminated polyester or polyether, preferably a polyether and more preferably an alkoxy-terminated polyethylene oxide radical.

Hydroxy components A2), A3) and A4) may contain double bonds that may originate from long-chain aliphatic carboxylic acids or fatty alcohols. Olefinic double bonds may be incorporated by allyl groups, acrylic acid or methacrylic acid, as well as their respective esters.

Suitable components A3) and A4) that contain an ionic group or are capable of forming an ionic group include dimethylolpropionic acid, hydroxypivalic acid, the propoxylated adduct of 2-butenediol and $NaHSO_3$, as well as building units that can be converted into cationic groups, such as N-methyldiethanolamine. Preferred components A3) and A4) are compounds having carboxy or carboxylate groups.

The preparation of the aqueous polyurethane dispersions A) may be carried out in known manner by reacting the polyisocyanate component with the polymeric polyol and low molecular weight chain extenders to form a polyurethane. A solvent is optionally and advantageously used, e.g., one that can subsequently be optionally separated again. Suitable solvents are known and include conventional lacquer solvents such as ethyl acetate, butyl acetate, ethylene glycol monomethyl or monoethyl ether acetate, 1-methoxypropyl-2-acetate, 3-methoxy-n-butyl acetate, acetone, 2-butanone, 4-methyl-2-pentanone, cyclohexanone, toluene, xylene, chlorobenzene and white spirit; mixtures that contain in particular higher substituted aromatics, such as those commercially available under the descriptions and trade names solvent naphtha, Solvesso (Exxon), Cypar (Shell), Cyclo Sol (Shell), Tolu Sol (Shell) and Shellsol (Shell); carbonic acid esters such as dimethyl carbonate, diethyl carbonate, 1,2-ethylene carbonate and 1,2-propylene carbonate; lactones such as β-propiolactone, γ-butyrolactone, ε-caprolactone and ε-methylcaprolactone; solvents such as propylene glycol diacetate, diethylene glycol dimethyl ether, dipropylene glycol dimethyl ether, diethylene glycol ethyl, butyl ether acetate, N-methylpyrrolidone and N-methylcaprolactam; and mixtures of any of the preceding solvents.

The groups capable of being neutralized may be converted into the salt form after preparation of the prepolymer and then the dispersion is produced with water. Depending on the degree of neutralization and content of ionic groups, the dispersion can be adjusted from a very fine particulate, which practically has the appearance of a solution, to very coarse particles, which are also sufficiently stable. Preferred however are small mean particle sizes of <100 nm or high proportions of hydrophilic groups, since this improves the emulsification of the polyisocyanate and thus the quality of the coating. Also, the solids content can be varied within wide limits, for example, from 20% to 50%.

Any excess isocyanate groups are then reacted with polyfunctional isocyanate-reactive compounds (chain extenders). For this purpose water or the polyamines previously mentioned under A4) are preferably used; diamines, triamines and hydrazine are especially preferred. Chain termination with monoamines, such as diethylamine, dibutylamine, ethanolamine, N-methyldiethanolamine or N,N-diethanolamine, is also possible.

It is also possible to modify the polyurethane dispersions according to the invention with polyacrylates. To this end an emulsion polymerization of olefinically unsaturated monomers, for example esters of (meth)acrylic acid and alcohols with 1 to 18 carbon atoms, styrene, vinyl esters or butadiene, is carried out in the presence of the polyurethane dispersion, as described for example in DE-A-1 953 348, EP-A-0 167 188, EP-A-0 189 945 and EP-A-0 308 115. The monomers contain one or more olefinic double bonds. In addition to this the monomers may contain functional groups such as hydroxyl, epoxy, methylol or acetoacetoxy groups.

Polyisocyanate component B) is selected from water-dispersible polyisocyanate mixtures based on aliphatic, cycloaliphatic, araliphatic and/or aromatic diisocyanates. Polyisocyanate component B) has
 a) an average isocyanate functionality of at least 2.0, preferably 2.3 to 9.9 and more preferably 2.8 to 5.8,
 b) a content of isocyanate groups (calculated as NCO; molecular weight 42) of 5.0 to 25.0 wt. %, preferably 6.0 to 22.5 wt. % and more preferably 8.5 to 21.5 wt. %, and c) a content of ethylene oxide units of 2 to 50 wt. %, preferably 5 to 40 wt. % and more preferably 7 to 25 wt. % (calculated as $C_2H_4O$; molecular weight 44) present within polyether chains containing an average of 5 to 35 ethylene oxide units, wherein at least 60 mole % of the polyether chains are connected via allophanate groups to two polyisocyanate molecules which are each prepared from at least two diisocyanate molecules.

The water-dispersible polyisocyanate mixtures may be prepared by reacting a polyisocyanate component B1) having an average NCO functionality of 2.0 to 5.0, a content of aliphatically, cycloaliphatically, araliphatically and/or aromatically bound isocyanate groups (calculated as NCO; molecular weight 42) of 8.0 to 27.0 wt. %, and a content of monomeric diisocyanates of less than 1 wt. % with a monohydric polyalkylene oxide polyether alcohol B2) having an average of 5 to 35 ethylene oxide units, at an NCO/OH equivalent ratio of 6:1 to 400:1. The reaction is carried out such that at least 60% of the urethane groups formed by NCO/OH reaction are further reacted to form allophanate groups. The nature and quantitative ratios of the starting products are also chosen such that the resulting reaction products satisfy the requirements of a) to c) above.

Component B1) has an average NCO functionality of 2.0 to 5.0, preferably of 2.3 to 4.5; a content of isocyanate groups of 8.0 to 27.0 wt. %, preferably 14.0 to 24.0 wt. %; and a content of monomeric diisocyanates of less than 1 wt. %, preferably less than 0.5 wt. %. The polyisocyanates of component B1) have aliphatically, cycloaliphatically, araliphatically and/or aromatically bound isocyanate groups.

The polyisocyanates or polyisocyanate mixtures of component B1) are polyisocyanates built up from at least two diisocyanate molecules and prepared by modifying simple aliphatic, cycloaliphatic, araliphatic and/or aromatic diisocyanates to incorporate uretdione, isocyanurate, allophanate, biuret, iminooxadiazine dione and/or oxadiazine trione groups. The preparation of these groups is described for example in the literature cited above for the preparation of the polyisocyanates A1).

Suitable diisocyanates for preparing polyisocyanates B1) are those which have a molecular weight of 140 to 400 and contain aliphatically, cycloaliphatically, araliphatically and/or aromatically bound isocyanate groups. Examples include 1,4-diisocyanatobutane, 1,6-diisocyanato-hexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophorone diisocyanate or IPDI), 4,4'-diisocyanatodicyclohexylmethane, 1-isocyanato-l-methyl-4 (3)isocyanato-methylcyclohexane, bis-(isocyanatomethyl)-norbornane, 1,3- and 1,4-bis-(2-isocyanato-prop-2-yl)-benzene (TMXDI), 2,4- and 2,6-diisocyanato-toluene (TDI), 2,4'- and 4,4'-diisocyanatodiphenyl-methane, 1,5-diisocyanatonaphthalene or mixtures thereof.

Components B1) is preferably selected from polyisocyanates or polyisocyanate mixtures having exclusively aliphatically and/or cycloaliphatically bound isocyanate groups. Particularly preferred starting components B1) are polyisocyanates or polyisocyanate mixtures containing isocyanurate groups and prepared from HDI, IPDI and/or 4,4'-diisocyanatodicyclohexylmethane.

Component B2) is selected from monohydric polyalkylene oxide polyether alcohols having an average 5 to 35, preferably 7 to 30, ethylene oxide units per molecule. These alcohols can be obtained in known manner by the alkoxylation of suitable starter molecules (see for example Ullmann's Encyclopädie der technischen Chemie, 4th Edition, Vol. 19, Verlag Chemie, Weinheim pp. 31–38).

Suitable starter molecules for the preparation of polyether alcohols B2) include saturated monohydric alcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexanes, 3-ethyl-3-hydroxy-methyloxyethane and tetrahydrofurfuryl alcohol; unsaturated alcohols such as allyl alcohol, 1,1-dimethylallyl alcohol and oleic alcohol; aromatic alcohols such as phenol, the isomeric cresols and methoxyphenols; araliphatic alcohols such as benzyl alcohol, anisol alcohol and cinnamic alcohol; secondary monoamines such as dimethylamine, diethylamine, dipropylamine, diisopropylamine, dibutylamine, diisobutylamine, bis-(2-ethylhexyl)-amine, N-methyl- and N-ethyl-cyclohexylamine and -dicyclohexylamine, and heterocyclic secondary amines (e.g., morpholine, pyrrolidine, piperidine or 1H-pyrazole).

Preferred starter molecules are saturated monohydric alcohols with up to 4 carbon atoms. Methanol is most preferably used as the starter molecule.

Preferred alkylene oxides for the alkoxylation reaction are ethylene oxide and propylene oxide, which may be used in sequence or as mixtures in the alkoxylation reaction.

Polyalkylene oxide polyether alcohols B2) are either pure polyethylene oxide polyethers or mixed polyalkylene oxide polyethers containing at least 30 mole %, preferably at least 40 mole %, of ethylene oxide units.

Preferred starting components B2) are pure polyethylene glycol monomethyl ether alcohols having an average of 7 to 30, preferably 7 to 25, ethylene oxide units.

Although less preferred, isocyanate-reactive compounds containing anionic or cationic groups, for example carboxylate, sulfonate or ammonium groups, may optionally be used in minor amounts as hydrophilic building block components in addition to the polyether alcohols B2).

In order to prepare water-dispersible polyisocyanate mixtures B), starting components B1) and B2) are reacted with one another at a temperature of 400 to 180° C., preferably 50° to 150° C., and at an NCO/OH equivalent ratio of 6:1 to 400:1, preferably 8:1 to 140:1, so that at least 60 mole %, preferably at least 80 mole % and more preferably at least 90 mole % of the urethane groups formed by NCO/OH reaction react further to form allophanate groups.

In order to accelerate the allophanatization reaction, suitable catalysts may optionally be used. Suitable catalysts include the known allophanatization catalysts, for example, the metal carboxylates, metal chelates or tertiary amines described in GB-A-0 994 890, the alkylation agents described in U.S. Pat. No. 3,769,318, and the strong acids described in EP-A-0 000 194.

Suitable allophanatization catalysts include zinc compounds such as zinc(II) stearate, zinc(II) n-octanoate, zinc (II) 2-ethyl-1-hexanoate, zinc(II) naphthenate and zinc(II) acetylacetonate; tin compounds such as tin(II) n-octanoate, tin(II) 2-ethyl-1-hexanoate, tin(II) laurate, dibutyl tin oxide, dibutyl tin dichloride, dibutyl tin diacetate, dibutyl tin dilaurate, dibutyl tin dimaleate and dioctyl tin diacetate; aluminum tri(ethylacetoacetate); iron (III) chloride; potassium octoate; manganese; cobalt or nickel compounds; strong acids such as trifluoroacetic acid, sulfuric acid, hydrogen chloride, hydrogen bromide, phosphoric acid and perchloric acid; and mixtures of these catalysts.

Also suitable are for preparing the water-dispersible polyisocyanate mixtures B) are compounds that also catalyze both the allophanatization reaction and the trimerization of isocyanate groups to form isocyanurate groups. Suitable catalysts are described, for example, in EP-A-0 649 866, p. 4, line 7 to p. 5, line 15.

Preferred catalysts for the preparation of water-dispersible polyisocyanate mixtures B) are the previously described zinc compounds, preferably zinc(II) n-octanoate, zinc(II) 2-ethyl-1-hexanoate and/or zinc(II) stearate.

The catalysts may be used in an amount of up to 5 wt. %, preferably 0.005 to 1 wt. %, based on the total weight of the reactants.

The addition of the reactants and catalyst to the reaction mixture may be effected by any suitable methods. For example, it is possible to mix the optional catalyst with either with the polyisocyanate component B 1) and/or the polyether component B2) before the start of the reaction. It is also possible to add the catalyst to the reaction mixture at any arbitrary point during the urethanization reaction or, during a two-stage reaction procedure, following urethanization, i.e., when the theoretical NCO content corresponding to a complete conversion of isocyanate and hydroxyl groups has been reached.

The course of the reaction can be followed for example by titrimetric determination of the NCO content. The reaction is terminated after the desired NCO content has been reached, preferably when the molar ratio of allophanate groups to urethane groups in the reaction mixture is at least 4:1, more preferably at least 9:1. This can be achieved by a purely thermal reaction procedure, for example, by cooling the reaction mixture to room temperature. In the case of the preferred use of an allophanatization catalyst, the reaction is preferably terminated by the addition of suitable catalyst poisons, for example, acid chlorides such as benzoyl chloride or isophthaloyl dichloride.

During the preparation of water-dispersible polyisocyanate mixtures B) the nature and quantitative ratios of the starting components are chosen such that the resulting polyisocyanate mixtures satisfy requirements a) to c). The NCO functionality of the water-dispersible polyisocyanate mixtures B) refer to the value that can be determined by calculation from the nature and functionality of the starting components according to the formula $$F = \frac{\sum equiv.NCO - \sum (1+x) \cdot mol\ OH}{\sum \left(\frac{equiv.NCO}{f_{NCO}}\right) + \sum mol\ OH - \sum(1+x) \cdot mol\ OH}$$

wherein
x represents the proportion of the urethane groups converted to allophanate groups in the process according to the invention.

The functionality fnco of starting polyisocyanates B1) can be calculated from the NCO content and from the molecular weight determined, which can be determined by gel permeation chromatography (GPC) or vapor pressure osmometry.

The preparation of water-dispersible polyisocyanate mixtures B) may optionally be carried out in a suitable solvent that is inert to isocyanate groups. Suitable solvents include known lacquer solvents such as ethyl acetate, butyl acetate, ethylene glycol monomethyl or monoethyl ether acetate, 1-methoxypropyl-2-acetate, 3-methoxy-n-butyl acetate, acetone, 2-butanone, 4-methyl-2-pentanone, cyclohexanone, toluene, xylene, chlorobenzene and white spirit; mixtures that contain in particular higher substituted aromatics such as those commercially available under the descriptions and trade names solvent naphtha, Solvesso, (Exxon), Cypar (Shell), Cyclo Sol (Shell); carbonic acid esters such as dimethyl carbonate, diethyl carbonate, 1,2-ethylene carbonate and 1,2-propylene carbonate; lactones such as β-propiolactone, γ-butyrolactone, ε-caprolactone and ε-methylcaprolactone; other solvents such as propylene glycol diacetate, diethylene glycol dimethyl ether, dipropylene glycol dimethyl ether, diethylene glycol ethyl, butyl ether acetate, N-methylpyrrolidone and N-methylcaprolactam; and mixtures of any of the preceding solvents.

The binder compositions according to the invention are preferably used for the formulation of coatings. In this connection the polyurethane dispersions according to the invention are used either alone or in combination with other aqueous binders, which may be hydroxy-functional or amino-functional. Such aqueous binders may be prepared for example from polyester, polyacrylate, polyepoxide or polyurethane polymers having hydroxy or amino groups. It is also possible to combine the binders containing hydroxyl or amino groups with other binders that do not contain hydroxy or amino groups, such as polyacrylate or polyacrylate-polystyrene emulsion polymers or radiation-curable binders.

The following examples illustrate the invention. The term "degree of allophanatization" denotes the percentage, which may be calculated from the NCO content, of the urethane groups formed from polyether alcohol and polyisocyanate, which have been converted to allophanate groups. All other parts and percentages are by weight unless otherwise indicated.

EXAMPLES

Example A1-Polyurethane dispersion 1

389 g of a polyester of adipic acid, hexanediol and neopentyl glycol (molar ratio of glycols 65:35, OH number 112 mg KOH/g), 28 g of neopentyl glycol, 39 g of dimethylolpropionic acid and 220 g of N-methylpyrrolidone were heated to 70° C. and stirred until a clear solution was formed. A mixture of 157 g of 4,4'-diisocyanatodicyclohexylmethane and 199 g of isophorone diisocyanate was then added. An exothermic reaction took place. The reaction mixture was kept at 100° C. until-the NCO content was 4.3 wt. %. The mixture was then cooled to 50° C. and 30 g of triethylamine were added and the reaction mixture was homogenized by stirring for 10 minutes. 850 g of the neutralized resin solution was then dispersed by stirring into 940 g of warm water at 42° C. The dispersion was stirred for an additional 5 minutes, and then a solution of 9.2 g of ethylenediamine and 10.5 g of diethylenetriamine in 104 g of water was added within 20 minutes. The resulting polyurethane dispersion had a mean particle size of 58 nm (determined by laser correlation spectroscopy).

Example A2- Polyurethane dispersion 2

525.0 g of a polyester of adipic acid and hexanediol (OH number 70 mg KOH/g, acid number 0.9 mg KOH/g), 124.3 g of 1,6-hexanediol, 44.9 g of dimethylolpropionic acid and 183.6 g of N-methylpyrrolidone were heated to 70° C. and stirred until a clear solution was formed. 535.0 g of isophorone diisocyanate were then added and the reaction mixture was heated to 80° C. The mixture was stirred at this temperature until the isocyanate content of the resulting prepolymer solution was 4.2%. The mixture was then cooled to 70° C. and 33.8 g of triethylamine were added. 1665.0 g of water at 40° C. were placed in a second 21 capacity 3-necked flask provided with an internal thermometer and stirred. 1250 g of the prepolymer were then added while stirring vigorously so that the temperature did not exceed 40° C. For this purpose the mixture was cooled with a water/ice bath. The dispersion was cooled to 20° C. Next, a solution of 28.2 g of ethylenediamine in 184.5 g of water was added within 15 minutes. The dispersion was then stirred at 30° C. until no isocyanate was detected by infrared spectroscopy. The resulting polyurethane dispersion had a mean particle size of 66 nm (determined by laser correlation spectroscopy).

Example A3- Polyurethane dispersion 3

366.9 g of the polyester described in Example A1, 26.4 g of neopentyl glycol, 37.2 g of dimethylolpropionic acid and 342.9 g of dipropylene glycol dimethyl ether were heated to 70° C. and stirred until a clear solution was formed. 369.7 g of 4,4'-diisocyanatodicyclohexyl-methane and 0.8 g of dibutyl tin dilaurate were then added. An exothermic reaction took place. The reaction mixture was kept at 75° C. until the NCO content was 3.8 wt. %. The solution was then cooled to 40° C. and 28 g of triethylamine were added and homogenized by stirring for 10 minutes. 1000 g of the neutralized resin solution were then dispersed by stirring in 939.2 g of warm water at 22° C. The mixture was stirred for a further 10 minutes, and then a solution of 11.9 g of ethylenediamine and 13.6 g of diethylenetriamine in 83.3 g of water was added within 20 minutes. The resulting polyurethane dispersion had a mean particle size of 37 nm (determined by laser correlation spectroscopy).

Example B1-Water-dispersible polyisocyanate mixture according to the invention 870 g (4.50 equiv.) of an isocyanurate group-containing polyisocyanate prepared from 1,6-diisocyanatohexane (HDI) and having an NCO content of 21.7%, a mean NCO functionality of 3.5 (according to gel permeation chromatography), a content of monomeric HDI of 0.1% and a viscosity of 3000 mPa.s (23° C.) were placed in a vessel at 100° C. under dry nitrogen. While stirring 130 g (0.37 equiv.) of a monofunctional polyethylene oxide polyether started on methanol and having a number average molecular weight of 350 were added within 30 minutes, which corresponded to an NCO/OH equivalent ratio of 12:1. Stirring was continued at this temperature until the NCO content of the mixture had fallen after about 2 hours to a value of 17.3% corresponding to complete urethanization. The allophanatization reaction was started by adding 0.01 g of zinc (II) 2-ethyl-1-hexanoate. The temperature of the reaction mixture rose to 106° C. due to the heat of reaction that was released. When no more heat was released, which was about 30 minutes after the addition of the catalyst, the reaction was terminated by adding 0.01 g of benzoyl chloride and the reaction mixture was cooled to room temperature. A practically colorless clear polyisocyanate mixture was obtained which had the following properties:

| | |
|---|---|
| NCO content: | 15.9% |
| Viscosity (23° C.): | 6400 mPa · s |
| Ethylene oxide content: | 11.8% |
| Degree of allophanatization: | 93% |

Example B2- Comparison polyisocyanate according to EP-B-0 540 985

870 g (4.50 equiv.) of the isocyanurate group-containing polyisocyanate described in Example A1 were placed in a vessel at 100° C. under dry nitrogen. While stirring 130 g (0.37 equiv.) of the polyether alcohol described in Example A1 were added, and the mixture was stirred further at this temperature until the NCO content of the mixture had fallen after about 2 hours to a value of 17.3% corresponding to complete urethanization. After cooling to room temperature, a colourless, clear polyisocyanate mixture was obtained which had the following properties:

| | |
|---|---|
| NCO content: | 17.3% |
| Viscosity (23° C.): | 3600 mPa · s |
| Ethylene oxide content: | 11.8% |
| Degree of allophanatization: | 0% |

Experiments 1–6

In order to formulate one-component (1K) clear coating compositions, the following formulation ingredients were added to the dispersions from Examples A1 and A2:

Butyl glycol (5 wt. %, 50% in water)

Defoaming agent: Tego Foamex 805 (Tego Chemie, 0.2 wt. %)

Additive to improve the undercoat wetting: Byk 346 (Byk-Chemie GmbH, 0.5 wt. %)

Thickening agent: Acrysol RM8 (Rohm and Haas, 1.0 wt. %)

In addition, a further 2 wt. % of N-methylpyrrolidone was added to the dispersion of Example A1.

In order to formulate the curing component, 33 wt. % of dipropylene glycol dimethyl ether was added to polyisocyanate curing agents B1 and B2 for experiments 2 and 3, and 53 wt. % was added for experiments 5 and 6. In order to formulate the two-component (2K) clear coating composition, these curing agent solutions were added, while shaking for 1 minute, as described below to the one-component (1K) clear coating compositions.

| | Without curing agent | With curing agent B1 | With curing agent B2 |
|---|---|---|---|
| Dispersion (Example A1) | Experiment 1 (1K) | Experiment 2 (2K) | Experiment 3 (2K) |
| Dispersion (Example A2) | Experiment 4 (1K) | Experiment 5 (2K) | Experiment 6 (2K) |

The coating compositions were a) knife coated with a 200 μm gap width onto glass plates. The curing behavior (pendulum damping according to DIN 53 157) as well as the abrasion value after 14 days (according to DIN 53 754, Taber Abraser, CS 10/1 kg/1000 revs) were then measured.

b) applied in 3 layers (in each case 100 g of lacquer/m²) to oak wood boards. After each stage the coating was thoroughly dried for 30 minutes at 50° C., and before applying the second and third layers the coating surface was lightly sanded.

After 7 days the resistance to ethanol (50% aqueous solution) and acetone were determined. For this purpose the following method was employed: cotton swabs impregnated with the solvent were placed on 7 day old coatings and covered with Petri dishes. After exposure times of 30 minutes (ethanol) or 10 seconds (acetone) an evaluation was made after the wet films had been carefully dried with a paper towel.

The shoe sole resistance was evaluated by impact-type damage to the film surface using a commercially available shoe stick-a-sole. The softening of the coating and the shoe sole strength were evaluated on a scale from 0 to 4.

| Value | Softening | Shoe sole resistance |
| --- | --- | --- |
| 0 | Unaltered | Unaltered |
| 1 | Very slight | Slight trace of damage detected |
| 2 | Somewhat more marked | Slight scratches detected |
| 3 | Easily damaged by fingernail contact | Scratches clearly recognized |
| 4 | Was easily wiped off | Surface burned |

The following test results illustrate the excellent resistance properties of the two-component coating compositions according to the invention compared to the corresponding one-component coating compositions, as well as the good optical properties (gloss and/or cloudiness) of Experiment 3 compared to Experiment 4. At the same time it can be seen that the one-component coating composition (Experiments 1 and 4) without isocyanate curing agent were also suitable as coating compositions, provided that less stringent requirements were placed on the resistance properties.

|  | Experiment 1 (1K) | Experiment 2 (2K) | Experiment 3 (2K) |
| --- | --- | --- | --- |
| Composition: | A1 | A1/B1 | A1/B2 |
| Incorporation: | — | ok | ok |
| Pressure drying (hrs) | 1.7 | 2.5 | 1.5 |
| Pendulum hardness 1d/7d | 64/105 | 46/99 | 46/76 |
| Alcohol (30 min) | 3 | 1 | 3– |
| Acetone (10 sec) | 3 | 1 | 1 |
| Shoe sole resistance | 4 | 0 | 0 |
| Abrasion (mg) | 29 | 15 | 13 |
| Gloss (60°) | 89 | 87 | <50 |
| Transparency | clear | clear | cloudy |

|  | Experiment 4 (1K) | Experiment 5 (2K) | Experiment 6 (2K) |
| --- | --- | --- | --- |
| Composition: | A2 | A2/B2 | A2/B2 |
| Incorporation: | — | ok | ok |
| Pressure drying (hrs) | 1.5 | 1.5 | 1.5 |
| Pendulum hard-ness 1d/7d | 104/137 | 59/127 | 57/130 |
| Alcohol (30 min) | 1 | 1 | 1 |
| Acetone (10 sec) | 4 | 1 | 1 |
| Shoe sole resistance | 4 | 0 | 0 |
| Abrasion (mg) | 18 | 15 | 16 |
| Gloss (60°) | 88 | 88 | 49 |
| Transparency | clear | clear | cloudy |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous binder composition comprising
    A) 70 to 99% of a polyurethane dispersion having an OH number of <10 mg KOH/g of solid resin and
    B) 1 to 30% of a water-dispersible polyisocyanate mixture prepared from an aliphatic, cycloaliphatic, araliphatic and/or aromatic diisocyanate, wherein the polyisocyanate mixture has
        a) an average isocyanate functionality of at least 2.0,
        b) a content of isocyanate groups (calculated as NCO; molecular weight 42) of 5.0 to 25.0 wt. %, and
        c) a content of ethylene oxide units of 2 to 50 wt. % (calculated as $C_2H_4O$; molecular weight 44) present within polyether chains containing an average of 5 to 35 ethylene oxide units,
    wherein at least 60 mole % of the polyether chains are connected via allophanate groups to two polyisocyanate molecules which are each prepared from at least two diisocyanate molecules and wherein the solids contents of components A) and B) add up to 100 wt. %.

2. The aqueous binder composition of claim 1 wherein polyurethane dispersion A) is prepared from
    A1) 5 to 70% by weight of polyisocyanates,
    A2) 10 to 80% by weight of polymeric polyols having a number average molecular weight of 400 to 6000,
    A3) 0 to 10% by weight of monohydric alcohols or monoamines,
    A4) 0.5 to 15% by weight of polyols, aminopolyols or polyamines having a number average molecular weight of less than 400 and
    A5) 0 to 20% by weight of polyoxyalkylene ethers having with at least one hydroxy or amino group,
    wherein the solids contents of components A1) to A5) add up to 100% and at least one of components A3) and/or A4) contains an ionic group or a group capable of forming an ionic group.

3. The aqueous binder composition of claim 1 wherein water-dispersible polyisocyanate mixture B) is the reaction product of
    B1) a polyisocyanate component having an average NCO functionality of 2.0 to 5.0, a content of aliphatically, cycloaliphatically, araliphatically and/or aromatically bound isocyanate groups (calculated as NCO; molecular weight 42) of 8.0 to 27.0 wt. % and a content of monomeric diisocyanates of less than 1 wt. % and
    B2) a monohydric polyalkylene oxide polyether alcohol having an average of 5 to 35 ethylene oxide units.

4. The aqueous binder composition of claim 2 wherein water-dispersible polyisocyanate mixture B) is the reaction product of
    B1) a polyisocyanate component having an average NCO functionality of 2.0 to 5.0, a content of aliphatically, cycloaliphatically, araliphatically and/or aromatically bound isocyanate groups (calculated as NCO; molecular weight 42) of 8.0 to 27.0 wt. % and a content of monomeric diisocyanates of less than 1 wt. % and
    B2) a monohydric polyalkylene oxide polyether alcohol having an average of 5 to 35 ethylene oxide units.

5. The aqueous binder composition of claim 2 wherein polyisocyanate component A1) comprises isophorone diisocyanate or 4,4'-diisocyanatodicyclohexyl-methane.

6. The aqueous binder composition of claim 4 wherein polyisocyanate component A1) comprises isophorone diisocyanate or 4,4'-diisocyanatodicyclohexyl-methane.

7. The aqueous binder composition of claim 1 wherein the dispersed polyurethanes of component A) have a mean particle size of <100 nm.

8. The aqueous binder composition of claim 2 wherein the dispersed polyurethanes of component A) have a mean particle size of <100 nm.

9. The aqueous binder composition of claim 3 wherein the dispersed polyurethanes of component A) have a mean particle size of <100 nm.

10. The aqueous binder composition of claim 4 wherein the dispersed polyurethanes of component A) have a mean particle size of <100 nm.

11. The aqueous binder composition of claim 3 wherein polyisocyanate component B1) has a functionality of 2.3 to 4.5 and a content of isocyanate groups of 14.0 to 24.0%.

12. The aqueous binder composition of claim 4 wherein polyisocyanate component B1) has a functionality of 2.3 to 4.5 and a content of isocyanate groups of 14.0 to 24.0%.

13. The aqueous binder composition of claim 6 wherein polyisocyanate component B1) has a functionality of 2.3 to 4.5 and a content of isocyanate groups of 14.0 to 24.0%.

14. A coating or adhesive composition containing the binder composition of claim 1.

15. A floor coating composition containing the binder composition of claim 1.

* * * * *